United States Patent
Rai et al.

(10) Patent No.: US 7,933,604 B1
(45) Date of Patent: Apr. 26, 2011

(54) METHOD AND SYSTEM FOR ACHIEVING REVERSE LINK GAIN THROUGH AN ASYMMETRIC SOFT HANDOFF

(75) Inventors: Deveshkumar Rai, Overland Park, KS (US); Manoj Shetty, Overland Park, KS (US); Sachin R. Vargantwar, Overland Park, KS (US); Siddharth S. Oroskar, Overland Park, KS (US); Ashvini Ganesh, Burlington, MA (US)

(73) Assignee: Sprint Spectrum L.P., Overland Park, KS (US)

( * ) Notice: Subject to any disclaimer, the term of this patent is extended or adjusted under 35 U.S.C. 154(b) by 795 days.

(21) Appl. No.: 11/935,226

(22) Filed: Nov. 5, 2007

(51) Int. Cl.
*H04W 36/00* (2009.01)
(52) U.S. Cl. .............. 455/442; 455/63.1; 455/67.13; 455/436; 455/437; 455/438; 455/439; 455/440; 455/441; 455/443; 455/444; 455/522; 370/331; 370/332; 370/333; 370/334
(58) Field of Classification Search .......... 455/436–444, 455/450, 501, 504–506, 63.1, 67.13; 370/318, 370/331–334
See application file for complete search history.

(56) References Cited

U.S. PATENT DOCUMENTS

| | | | |
|---|---|---|---|
| 5,781,861 | A | 7/1998 | Kang et al. |
| 5,864,760 | A | 1/1999 | Gilhousen et al. |
| 6,049,716 | A | 4/2000 | Jung |
| 6,154,653 | A | 11/2000 | Jung |
| 6,157,668 | A | 12/2000 | Gilhousen et al. |
| 6,381,458 | B1 | 4/2002 | Frodigh et al. |
| 6,714,788 | B2 | 3/2004 | Voyer |
| 6,993,341 | B2 | 1/2006 | Hunziger |
| 7,194,281 | B2 | 3/2007 | Peng et al. |
| 7,248,875 | B2 | 7/2007 | Schreuder et al. |
| 7,292,856 | B2 | 11/2007 | Julian et al. |
| 2005/0073975 | A1 | 4/2005 | Chen et al. |

*Primary Examiner* — Stephen M D'Agosta

(57) ABSTRACT

A wireless network is used for a communication session between a mobile station and an endpoint. The wireless network receives endpoint bits representing communications from the endpoint for the mobile station and uses a first sector to transmit a forward link signal that encodes the endpoint bits. The mobile station generates mobile station bits representing communications from the mobile station for the endpoint and transmits a reverse link signal encoding the mobile station bits. A controller detects an imbalance between an error level in the forward link signal received by the mobile station and an error level in the reverse link signal received by the first sector. In response, the wireless network uses a second sector to receive the reverse link signal without using the second sector to transmit the endpoint bits. The reverse link signals received by the first and second sectors may be combined for diversity gain.

14 Claims, 3 Drawing Sheets

METHOD AND SYSTEM FOR ACHIEVING REVERSE LINK GAIN THROUGH AN ASYMMETRIC SOFT HANDOFF

BACKGROUND

For certain types of wireless communication, such as wireless communication that uses code division multiple access (CDMA), a mobile station may able to use more than wireless link for a communication session. Even though each wireless link may convey the same information, the signal diversity from using multiple wireless links may be used to achieve a signal gain that is often described as "soft handoff gain." Thus, the mobile station may be able to combine the forward link signals from the multiple wireless links to achieve a higher signal-to-noise ratio (SNR) for the forward link, and the network may be able to combine the reverse link signals from the multiple wireless links to achieve a higher SNR for the reverse link.

Overview

In a first principal aspect, an exemplary embodiment provides a method for maintaining a communication session between a mobile station and an endpoint. During the communication session, a wireless network receives endpoint bits representing communications from the endpoint, a first sector of the wireless network transmits the endpoint bits in a forward link signal, the mobile station generates mobile station bits representing communications from the mobile station, the mobile station transmits the mobile station bits in a reverse link signal, the mobile station receives the forward link signal, and the first sector receives the reverse link signal. In accordance with the method, a forward-link error level in the forward link signal received by the mobile station is determined. A reverse-link error level in the reverse-link signal received by the first sector is determined. An imbalance between the forward-link error level and the reverse-link error level is determined. In response to the imbalance, a second sector is used to receive the reverse link signal without using the second sector to transmit the endpoint bits.

In a second principal aspect, an exemplary embodiment provides a system for facilitating communication between a mobile station and an endpoint. The system comprises: a first transceiver for transmitting a forward link signal to the mobile station and receiving a reverse link signal from the mobile station; a second transceiver; and a controller communicatively coupled to the first and second transceivers. The forward link signal encodes endpoint bits that represent communications from the endpoint for a communication session. The reverse link signal encodes mobile station bits that represent communications from the mobile station for the communication session. The controller is configured to: (a) detect an imbalance between a forward-link error level in the forward link signal received by the mobile station and a reverse-link error level in the reverse link signal received by the first transceiver; and (b) in response to the imbalance, cause the second transceiver to receive the reverse link signal without transmitting the endpoint bits.

DETAILED DESCRIPTION OF EXEMPLARY EMBODIMENTS

1. Introduction

While the use of multiple sectors for a mobile station's communication session can beneficially provide soft handoff gain, the inventors have recognized that the benefits come at a price: an increased risk of dropped calls, blocked calls, and other resource-based service impairments caused by the increased usage of communication resources.

To make use of the advantages of soft handoff gain, while mitigating the disadvantages, the inventors propose an asymmetric soft handoff approach that can provide additional gain for the reverse link without consuming additional forward link resources. For example, if a mobile station is using a first sector of a wireless network for a communication session, the wireless network may use a second sector to receive the mobile station's communications without using the second sector to transmit communications to the mobile station for the communication session. The signals received by the first and second sectors may then be combined to achieve reverse link diversity gain. Thus, the use of the second sector may beneficially provide a higher signal-to-noise ratio (SNR) for the reverse link but does not consume additional forward link resources because the second sector does not transmit forward link signals for the communication session.

An asymmetric soft handoff may be used when there is an imbalance between a forward-link error level in the first sector's forward link signal received by the mobile station and a reverse-link error level in the mobile station's reverse link signal received by the first sector. A controller in the wireless network may determine that an imbalance exists when, for example, the reverse-link error level is greater than a target reverse-link error level for a certain period of time and the forward-link error level is less than a target forward-link error level during this period of time. In response to the imbalance, the controller may select a second sector to use for the communication session. The second sector may be selected from among a plurality of candidate sectors identified by the mobile station based on, for example, the sectors' pilot signal strengths reported by the mobile station and/or the sectors' resource availability. The controller may then cause the second sector to begin receiving the mobile station's reverse link signal without allocating a forward link traffic channel in the second sector for the communication session. As a result, the second sector receives the mobile station's communications for the communication session but does not transmit communications to the mobile station for the communication session.

In this way, communication sessions that may benefit from additional reverse link gain may be identified, and the additional reverse link gain may be provided without consuming additional forward link resources.

2. Exemplary Network Architecture

Figure 1:
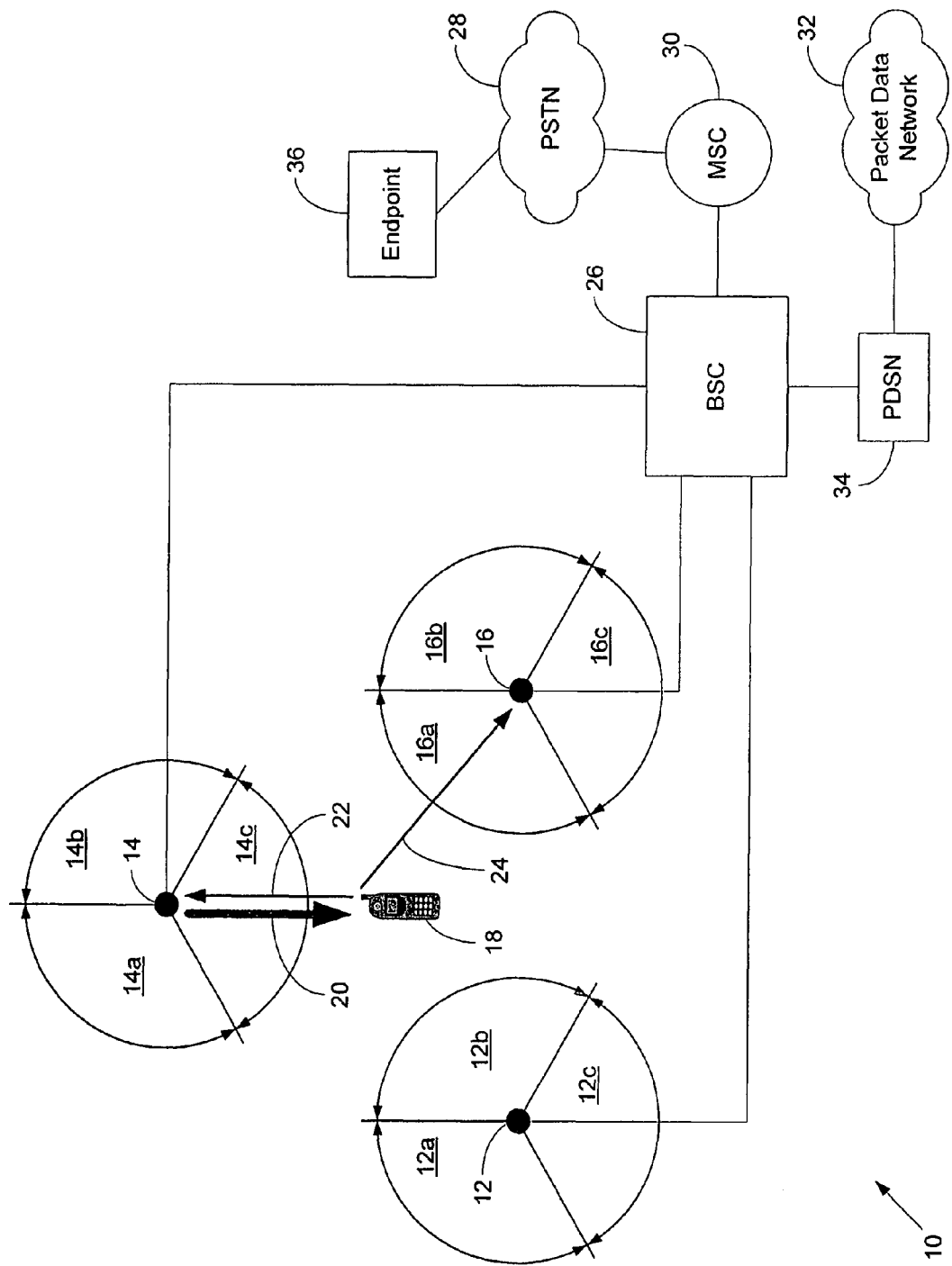
FIG. 1 is a block diagram of a wireless telecommunications network, in accordance with an exemplary embodiment.

FIG. 1 illustrates an exemplary wireless telecommunications network 10 in which exemplary embodiments may be employed. Network 10 includes a plurality of base transceiver stations (BTSs), exemplified in FIG. 1 by BTSs 12, 14, and 16. Each BTS may be able to wirelessly communicate with mobile stations, such as mobile station 18. Mobile station 18 could be a wireless telephone, wireless personal digital assistant, wireless e-mail device, wirelessly-equipped laptop computer, or other wireless communication device.

Each BTS may include directional antennas to define a plurality of sectors. For example, BTS 12 may have sectors 12a, 12b, and 12c, BTS 14 may have sectors 14a, 14b, and 14c, and BTS 16 may have sectors 16a, 16b, and 16c. Although FIG. 1 shows each BTS with three sectors, it is to be understood that a BTS may have a greater or fewer number of sectors. Moreover, it is to be understood that the illustration of sectors in FIG. 1 is schematic only and that FIG. 1 is not intended to illustrate the precise geographic area covered by any sector.

In an exemplary embodiment, the wireless communications between the BTSs and the mobile station communicates use a code division multiple access (CDMA) air interface, such as 1xRTT or EV-DO. Although FIG. 1 is described herein with respect to CDMA, it is to be understood that CDMA is exemplary only. Other types of air interface formats could be used for the wireless communication.

In the CDMA case, each sector may be identified by a distinct pseudonoise (PN) code offset. Thus, the signals transmitted by each sector may be spread spectrum signals that are spread by a PN code with the sector's particular offset. Each sector may have available to it a number of forward channels for transmitting forward link signals, with each of the forward channels being identified by a distinct Walsh code. The forward channels may include a plurality of control channels, such as a pilot channel, a sync channel, and one or more paging channels. The forward channels may also include a plurality of forward traffic channels. Each sector may also be able to receive up to a certain number of reverse link channels. The reverse link channels may include access channels and reverse traffic channels.

A mobile station may transmit a reverse link signal in an access channel in order to request access to the wireless network. Once access is granted, the mobile station may then transmit a reverse link signal in a reverse traffic channel. The reverse traffic channel may be identified by a user-specific PN code. The user-specific PN code could be, for example, a code that the mobile station generates based on its electronic serial number (ESN). Thus, a reverse link signal corresponding to a reverse link traffic channel may be a spread spectrum signal that is spread by a PN code that is specific to the mobile station that transmitted it.

More than one sector may be used to transmit signals to and/or receive signals from a mobile station. For example, FIG. 1 shows mobile station 18 with three wireless communication links: forward link 20 transmitted by sector 14c and received by mobile station 18; reverse link 22 transmitted by mobile station 18 and received by sector 14c; and reverse link 24 transmitted by mobile station 18 and received by sector 16a. As described in more detail below, reverse link 22 and reverse link 24 may represent the same reverse link signal that is received by two different sectors.

Although FIG. 1 shows mobile station 18 using three wireless communication links, it is to be understood that a mobile station may use a greater or fewer number of wireless communication links. In addition, although FIG. 1 shows wireless communications links 20, 22, and 24, with different BTSs, it is to be understood that a mobile station may have more than one wireless communication link with the same BTS (e.g., using different sectors of the BTS). In some cases, a mobile station may have more than one wireless communication link with the same sector.

BTSs 12, 14, and 16 may be controlled by a base station controller (BSC) 26. BSC 26 may control the use of forward and reverse traffic channels for wireless communication between BTSs 12, 14, and 16 and mobile stations, such as mobile station 18. Although FIG. 1 shows three BTSs (BTS 12, 14, and 16) and nine sectors (sectors 12a-c, 14a-c, and 16a-c) in the service area of BSC 26, it is to be understood that a BSC could have a greater or fewer number of BTSs and/or sectors in its service area.

BSC 26 may be communicatively coupled to a circuit-switched network, such as public switched telephone network 28, e.g., via a mobile switching center 30. BSC 26 may also be communicatively coupled to a packet-switched network, such as packet data network 32, e.g., via a packet data serving node (PDSN) 34. Mobile stations, such as mobile station 18, may engage in communication sessions with various endpoints via PSTN 28 or packet data network 32, in order to exchange voice, data, or other media. For example, a mobile station may engage in a voice call with an endpoint 36 via PSTN 28. Alternatively, a mobile station may engage in a data session with an endpoint via packet data network 32, e.g., for voice-over-packet (VoP) communication, to send or receive e-mail, to browse the World Wide Web, to receive streaming video and/or audio, to participate in Internet gaming, or for other purposes.

A mobile station may use a plurality of wireless links for a communication session with an endpoint. For example, mobile station 18 may use forward link 20 and reverse links 22 and 24 for a communication session with endpoint 36 via PSTN 28 (or with an endpoint via PDN 32). During the communication session, network 10 may receive endpoint bits representing communications from endpoint 36 intended for mobile station 18, and sector 14c may transmit a forward link signal, represented by forward link 20, encoding the endpoint bits. In addition, mobile station 18 may generate mobile station bits representing communications from mobile station 18 intended for endpoint 36, and mobile station 18 may transmit a reverse link signal encoding the mobile station bits. Sector 14c may receive the reverse link signal as reverse link 22, and sector 16a may receive the reverse link signal as reverse link 24. The reverse link signals received by sectors 14c and 16a may be combined (e.g., at BSC 26) in order to achieve reverse link diversity gain.

Although FIG. 1 illustrates an asymmetric handoff scenario in which a mobile station uses one dual-link sector (sector 14c) and one single-link sector (sector 16a) for a communication session, it is to be understood that more than one dual-link sector and/or more than one single-link sector could be used. For example, sector 12b might also be used for the communication session, either as a dual-link sector (transmitting a forward link signal to the mobile station and receiving the mobile station's reverse link signal) or as a single-link sector (only receiving the mobile station's reverse link signal).

As described in more detail below, sector 16a may be used to receive the reverse link signal transmitted by mobile station 18 in response to an instruction from BSC 26. More particularly, the instruction from BSC 26 may cause BTS 16 to use a transceiver associated with sector 16a to begin receiving the reverse link signal from mobile station 18 without transmitting to mobile station 18.

Figure 2:
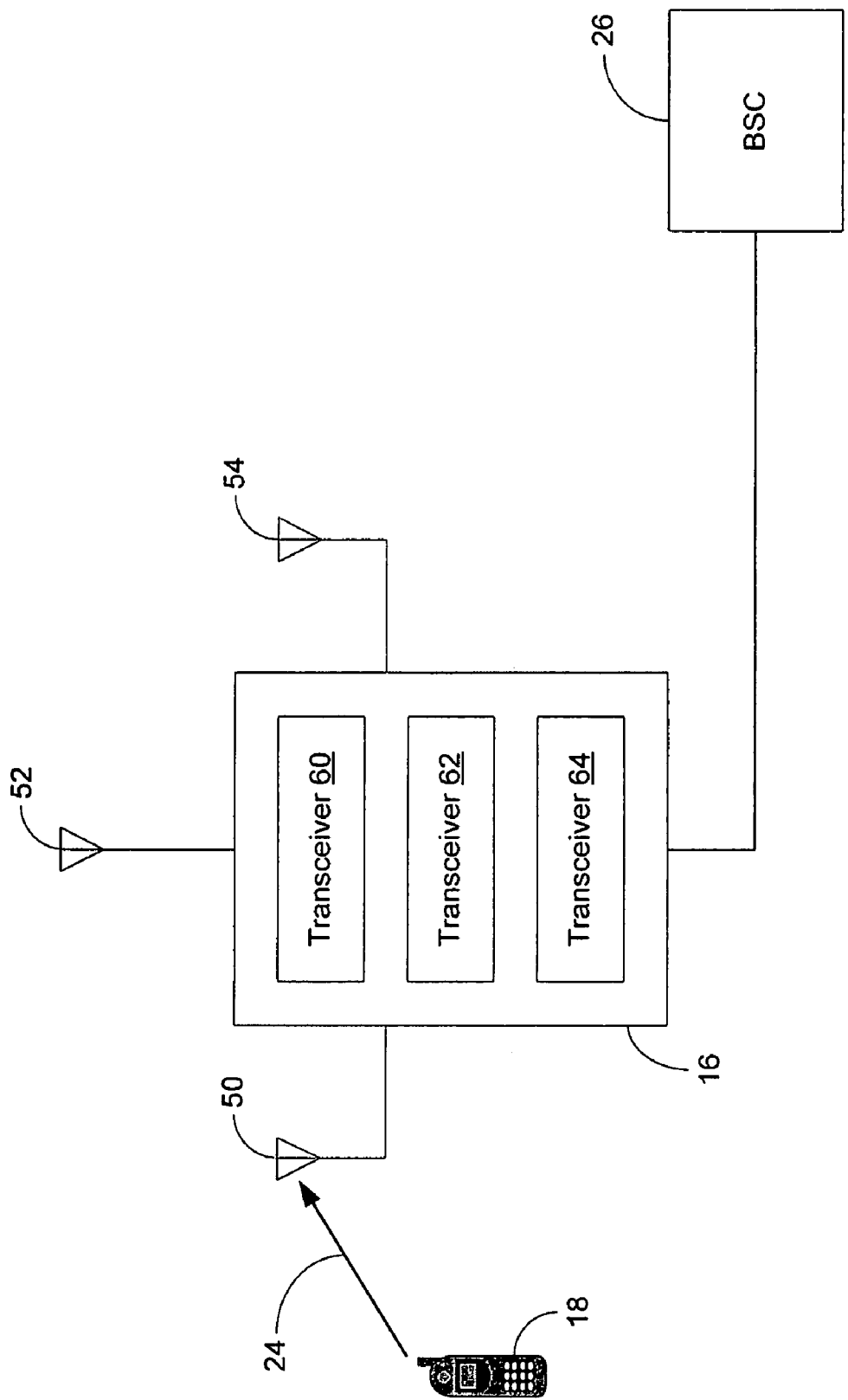
FIG. 2 is a block diagram of part of the wireless telecommunications network of FIG. 1, in accordance with an exemplary embodiment.

FIG. 2 illustrates an exemplary configuration of BTS 16 communicatively coupled to BSC 26. BTS 16 may include directional antennas 50, 52, and 54 associated with sectors 16a, 16b, and 16c, respectively. In addition, BTS 16 may include a plurality of transceivers, with each transceiver being associated with one of sectors 16a, 16b, and 16c. For example, BTS 16 may include a transceiver 60 associated with sector 16a, a transceiver 62 associated with sector 16b, and a transceiver associated with sector 16c. Although FIG. 2 shows only one transceiver for each sector, it is to be understood that BTS 16 may include a plurality of transceivers for each sector. In addition, although FIG. 2 illustrates a configuration for BTS 16, it is to be understood that BTS 12 and BTS 14 may be similarly configured.

Each of transceivers 60, 62, and 64 may be capable of transmitting a forward link signal to a mobile station (e.g., using a forward traffic channel) while also receiving a reverse link signal from the mobile station. However, as described in more detail below, BSC 26 may instruct BTS 16 to use sector 16a to receive a reverse link signal from mobile station 18 without transmitting to mobile station 18. In response to the instruction, BTS 16 may begin using transceiver 60 to receive the reverse link signal transmitted by mobile station 18 (as represented in FIG. 2 by reverse link 24) without using transceiver 60 to transmit to mobile station 18. Thus, the forward link resources of transceiver 60 could be used for other tasks, such as transmitting to other mobile stations.

3. Exemplary Operation

Figure 3:
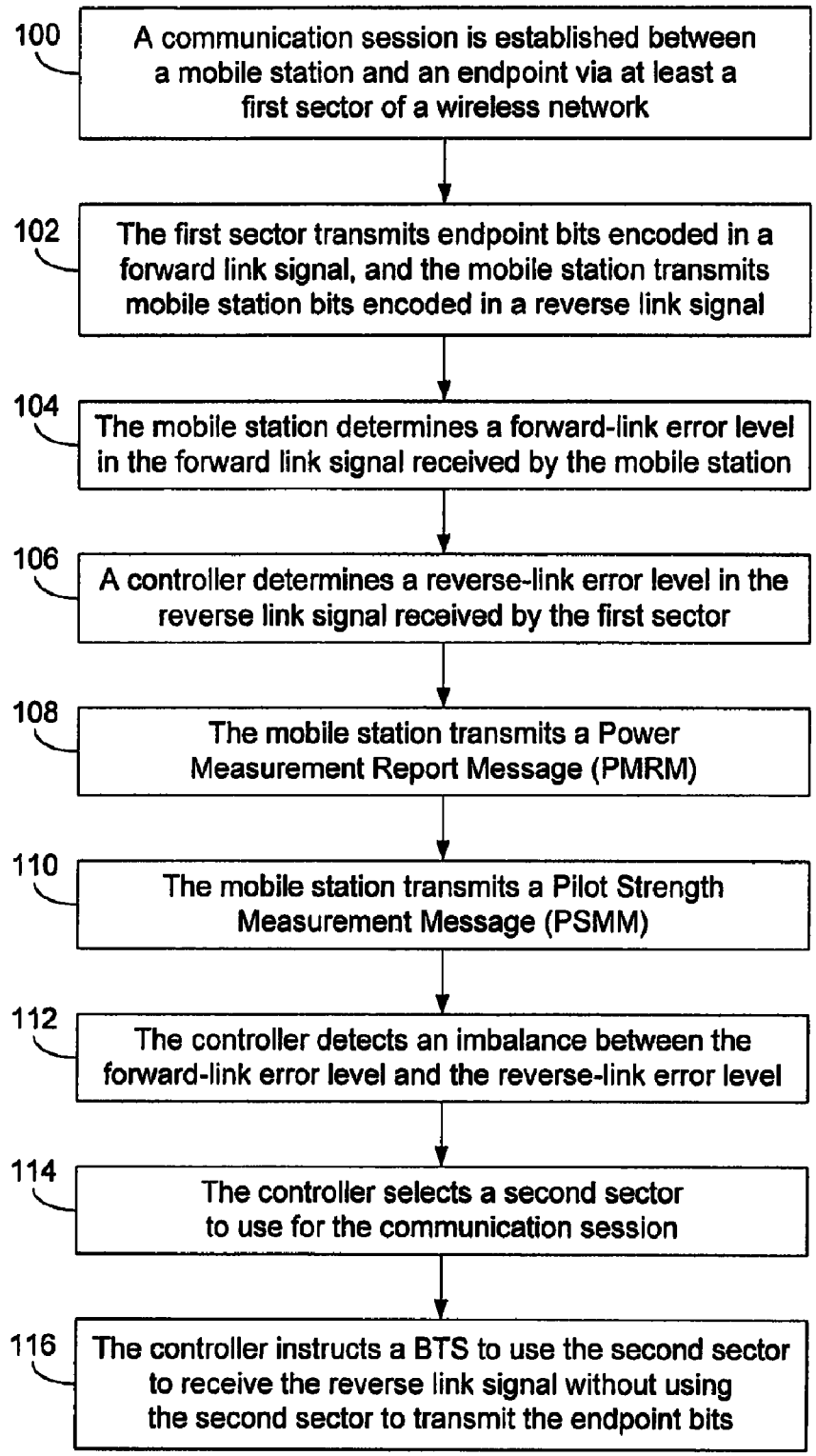
FIG. 3 is a flow chart illustrating an asymmetric soft handoff method, in accordance with an exemplary embodiment.

FIG. 3 is a flow chart illustrating an exemplary method of operation. The method may begin when a communication session is established between a mobile station and an endpoint via at least a first sector of a wireless network, as indicated by block 100. For example, with reference to FIG. 1, the mobile station could be mobile station 18, the first sector could be sector 14c, and the endpoint could be endpoint 36 communicatively coupled to PSTN 28. Thus, the communication session could involve the mobile station and endpoint engaging in voice communication (e.g., a voice call). It is to be understood, however, that the mobile station could alternatively be engaged in a communication session with an endpoint communicatively coupled to packet data network 32. In that case, the communication session might involve, for example, VoP communication, Web browsing, streaming audio and/or video, or Internet gaming.

During the communication session, the first sector transmits endpoint bits encoded in a forward link signal, and the mobile station transmits mobile station bits encoded in a reverse link signal, as indicated by block 102. The endpoint bits may represent in a digital form the voice, data, or other communications that the endpoint is sending to the mobile station for the communication session, and the mobile station bits may represent in a digital form the voice, data, or other communications that the mobile station is sending to the endpoint for the communication session.

The first sector may receive the reverse link signal from the mobile station and may recover the mobile station bits encoded therein. Similarly, the mobile station may receive the forward link signal from the first sector and may recover the endpoint bits encoded therein. The mobile station bits and the endpoint bits may each be transmitted in a series of frames. Each frame may have a fixed duration, such as 20 milliseconds.

Sometimes, when a frame is received by the first sector or by the mobile station, some or all of the bits in the frame cannot be recovered, e.g., because the signal-to-noise ratio is too low. Such frames may be identified as error frames. The first sector and the mobile station may each keep track of the number of error frames it encounters in order to determine an error level in its respective received signal. Thus, the mobile station may determine a forward-link error level in the forward link signal received by the mobile station, as indicated by block 104. Similarly, a controller (e.g., BSC 26) may determine a reverse-link error level in the reverse link signal received by the first sector, as indicated by block 106.

The error levels that are determined could be, for example, frame error rates. A frame error rate may be characterized as the percentage of error frames within a certain number of frames. The mobile station may report the forward-link error level to the controller by transmitting a Power Measurement Management Report (PMRM), as indicated by block 108. The PMRM could, for example, report the number of error frames encountered during a measurement interval, as well as the total number of frames in the measurement interval. The controller may then determine the forward-link frame error rate from this information. Alternatively, the PMRM may report the forward-link error level in other ways.

The mobile station may also periodically transmit a Pilot Strength Measurement Message (PSMM), as indicated by block 110. The PSMM may report the signal strengths of pilot signals from a plurality of sectors that are measured by the mobile station. The plurality of sectors may include one or more sectors that the mobile station is using for the communication session, i.e., the sectors in the mobile station's "active set." The plurality of sectors may also include other sectors, such as sectors that may be candidates for inclusion in the mobile station's active set through a soft handoff process.

In an exemplary embodiment, the PSMM indicates the pilot signal strength for each sector as an $E_C/I_0$ value, wherein $E_C$ is the energy per chip and $I_0$ is the interference power density. It is to be understood, however, that the pilot signal strengths could be measured by the mobile station and/or reported in the PSMM in terms of parameters other than $E_C$ and $I_0$.

At some point, the controller may detect an imbalance between the forward-link error level and the reverse-link error level, as indicated by block 112. The controller may detect an imbalance by comparing the forward-link error level to a target forward-link error level used for forward link power control and by comparing the reverse-link error level to a target reverse-link error level used for reverse link power control. An imbalance may be indicated, for example, when the reverse-link error level is greater than the target reverse-link error level for a defined duration (a certain period of time) and the forward-link error level is less than the target forward-link error level during the defined duration. It is to be understood that these criteria are exemplary only, as other criteria may be used for determining when an imbalance exists. For example, the criteria might also indicate an imbalance when the reverse-link error level is greater than the target reverse-link error level for a defined duration and the forward-link error level is equal to or nearly equal to the target forward-link error level during the defined duration.

In response to detecting an imbalance, the controller may select a second sector to use for the communication session, as indicated by block 114. The controller may select the second sector from among the plurality of sectors identified in the mobile station's PSMM using a selection algorithm. For example, the controller may first identify the highest pilot signal strength in the mobile station's PSMM. The highest pilot signal strength could be, for example, the signal strength of the pilot signal transmitted by the first sector. Next, the controller may identify any sector indicated in the mobile station's PSMM as having a pilot signal strength that is (i) within a predetermined range (e.g., within 5 dB) of the highest pilot signal strength and/or (ii) greater than a predetermined threshold value. The predetermined threshold value may be a parameter that defines the minimum pilot signal strength a sector must have for the sector to be added to the mobile station's active set. The controller may then check whether any of the identified sectors have reverse link resources available. If the controller determines that more than one sector fulfills all of the selection criteria, then the controller may select the sector from among these sectors that has the highest pilot signal strength in the mobile station's PSMM.

Once the controller selects the second sector to use for the communication session, the controller may instruct a BTS to use the second sector to receive the reverse link signal without using the second sector to transmit the endpoint bits, as indicated by block 116. For example, with reference to FIGS. 1 and 2, BSC 26 may instruct BTS 16 to use sector 16*a* to receive the reverse link signal of mobile station 18 without using sector 16*a* to transmit to mobile station 18. In response, BTS 16 may begin using transceiver 60 associated with sector 16*a* to receive the reverse link signal of mobile station 18, without using a forward traffic channel in sector 16*a* for the communication session.

It is to be understood that, in this approach, sector 16*a* does not transmit the endpoint bits that represent the endpoint's communications in the communication session. However, sector 16*a* might still be used to transmit other forward link signals to mobile station 18, such as paging signals, overhead information, or other communications that use forward control channels rather than forward traffic channels. Sector 16*a* might also use one or more forward traffic channels to transmit forward link signals to mobile station 18 for one or more other communication sessions. Alternatively, sector 16*a* might not transmit any signals to mobile station 18, other than broadcast signals (which are not intended for any specific mobile station), such as pilot or synch signals.

Although more than one sector is used for the reverse link, it is to be understood that mobile station 18 may still be transmitting only one reverse link signal. The reverse link signal may simply be received by two different sectors, with reverse link 22 representing the reverse link signal received by sector 14*c* and reverse link 24 representing the reverse link signal received by sector 16*a*.

The reverse links received by sectors 14*c* and 16*a* may be combined (e.g., at BSC 26) to achieve reverse link diversity gain. The reverse link diversity gain resulting from combining the reverse links received by the two sectors may provide a higher effective signal-to-noise ratio and, thus, a lower reverse-link error level, than the reverse link received by either sector alone. Thus, the use of the second sector for the communication session may beneficially correct (at least partially) the imbalance between the forward-link and reverse-link error levels. However, because the second sector receives the reverse link signal without transmitting the endpoint bits, the second sector's forward traffic channel resources are not consumed by the use of an additional forward link traffic channel. In this way, the benefits of reverse link diversity gain may be realized without consuming additional forward link resources.

In this regard, the controller may continually monitor the resource usage of the second sector. If the controller detects a resource limitation in the second sector, the controller may determine that the second sector should no longer be used for the communication session. In response, the controller may instruct the BTS to discontinue using the second sector to receive the mobile station's reverse link signal.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for maintaining a communication session between a mobile station and an endpoint, wherein during said communication session a wireless network receives endpoint bits representing communications from said endpoint, a first sector of said wireless network transmits said endpoint bits in a forward link signal, said mobile station generates mobile station bits representing communications from said mobile station, said mobile station transmits said mobile station bits in a reverse link signal, said mobile station receives said forward link signal, and said first sector receives said reverse link signal, said method comprising:
   determining a forward-link error level in said forward link signal received by said mobile station;
   determining a reverse-link error level in said reverse link signal received by said first sector;
   detecting an imbalance between said forward-link error level and said reverse-link error level;
   in response to said imbalance, selecting a second sector from among a plurality of candidate sectors identified by said mobile station, wherein selecting said second sector from among a plurality of candidate sectors identified by said mobile station comprises determining that said second sector has reverse-link resources available to receive said reverse link signal; and
   using said second sector to receive said reverse link signal without using said second sector to transmit said endpoint bits.

2. The method of claim 1, further comprising:
   combining said reverse link signal received by said first sector with said reverse link signal received by said second sector to achieve reverse link diversity gain.

3. The method of claim 1, wherein detecting an imbalance between said forward-link error level and said reverse-link error level comprises:
   determining that said reverse-link error level is greater than a reverse-link target error level for a defined duration.

4. The method of claim 3, wherein detecting an imbalance between said forward-link error level and said reverse-link error level further comprises:
   determining that said forward-link error level is less than a target forward-link error level for said defined duration.

5. The method of claim 4, wherein said forward-link error level, said target forward-link error level, said reverse-link error level, and said reverse-link target error level are frame error rates, and wherein said defined duration is a defined number of frames.

6. The method of claim 1, wherein selecting said second sector from among a plurality of candidate sectors identified by said mobile station further comprises:
   comparing a second-sector signal strength to a primary-sector signal strength, wherein said second-sector signal strength is a signal strength of a pilot signal from said second sector reported by said mobile station and said primary-sector signal strength is a highest signal strength reported by said mobile station; and
   determining that said second-sector signal strength is within a predetermined range of said primary-sector signal strength.

7. The method of claim 1, wherein selecting said second sector from among a plurality of candidate sectors identified by said mobile station further comprises:
   determining that a second-sector signal strength exceeds a predetermined threshold value, wherein said second-sector signal strength is a signal strength of a pilot signal from said second sector reported by said mobile station.

8. The method of claim 1, wherein determining a forward-link error level in said forward link signal received by said mobile station comprises:

obtaining a measurement report from said mobile station, said measurement report specifying said forward-link error level.

9. A system for facilitating wireless communication between a mobile station and an endpoint, said system comprising:

a first transceiver for transmitting a forward link signal to said mobile station and receiving a reverse link signal from said mobile station, said forward link signal encoding endpoint bits, said reverse link signal encoding mobile station bits, said endpoint bits representing communications from said endpoint for a communication session and said mobile station bits representing communications from said mobile station for said communication session, wherein said first transceiver corresponds to a first sector;

a second transceiver, wherein said first transceiver corresponds to a second sector; and a controller communicatively coupled to said first and second transceivers, said controller configured to:
 (a) detect an imbalance between a forward-link error level in said forward link signal received by said mobile station and a reverse-link error level in said reverse link signal received by said first transceiver;
 (b) receive a measurement report from said mobile station, said measurement report identifying a plurality of sectors and a signal strength measurement for each sector;
 (c) in response to said imbalance, select said second sector from among said plurality of sectors based, at least in part, on said measurement report and on reverse-link resource availability in said second sector; and
 (d) cause said a second transceiver to receive said reverse link signal without transmitting said endpoint bits.

10. The system of claim 9, wherein said controller is further configured to combine said reverse link signal received by said first transceiver with said reverse link signal received by said second transceiver to achieve reverse link diversity gain.

11. The system of claim 9, wherein said controller is configured to detect said imbalance when said reverse-link error level is greater than a target reverse-link error level for a defined duration and said forward-link error level is less than a target forward-link error level for said defined duration.

12. The system of claim 9, wherein said controller is configured to cause said second transceiver to receive said reverse link signal without transmitting said endpoint bits by a process comprising:

instructing a base transceiver station (BTS) associated with said second sector to use said second sector to receive said reverse link signal without using a forward traffic channel in said second sector for said communication session.

13. The system of claim 9, wherein said reverse link signal is a spread spectrum signal with a spreading code that is specific to said mobile station.

14. The system of claim 9, wherein said controller comprises a base station controller (BSC).

* * * * *